Sept. 4, 1956  C. A. TODD  2,761,948
PAINT BAKING APPARATUS
Filed Nov. 23, 1953  2 Sheets-Sheet 1

Clyde A. Todd
INVENTOR.

BY *Clarence A. O'Brien*
*and Harvey B. Jacobson*
Attorneys

Sept. 4, 1956 C. A. TODD 2,761,948
PAINT BAKING APPARATUS
Filed Nov. 23, 1953 2 Sheets-Sheet 2
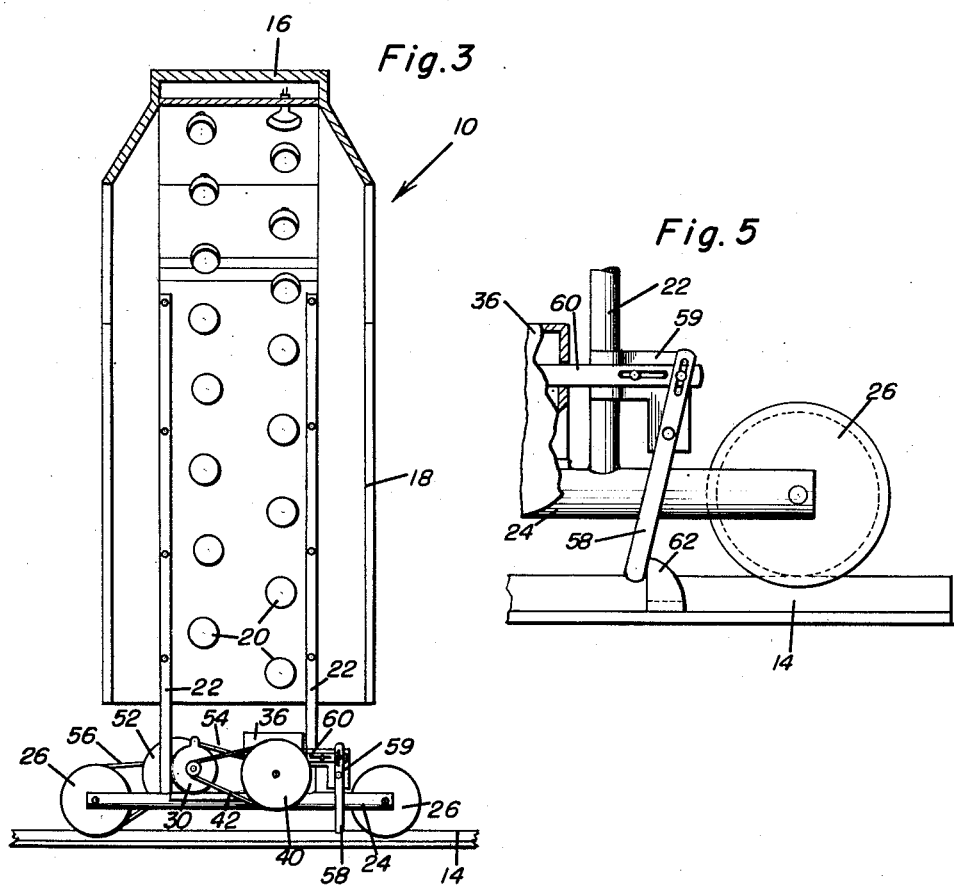
Clyde A. Todd
INVENTOR.

United States Patent Office 2,761,948
Patented Sept. 4, 1956

2,761,948

PAINT BAKING APPARATUS

Clyde A. Todd, Tampa, Fla.; Clara G. Todd, executrix of said Clyde A. Todd, deceased Application November 23, 1953, Serial No. 393,558

1 Claim. (Cl. 219—35)

This invention relates to a paint baking apparatus, and more particularly to a traveling support for infra-red lamps used in treating freshly painted automobiles or the like.

An object of this invention is to provide a paint baking apparatus which is mounted for movement on a pair of spaced parallel rails.

Another object of this invention is to provide a paint baking apparatus which is adapted to move forwardly and rearwardly over an automobile and having automatic means for reversing the direction of movement of the apparatus.

A further object of this invention is to provide a paint baking apparatus which can be adjusted to travel forwardly and rearwardly at any desired speed.

A still further object of this invention is to provide a paint baking apparatus which is mobile and easy to install.

A yet further object of this invention is to provide a paint baking apparatus which is simple and efficient in construction and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a sectional view taken substantially along the section line 3—3 of Figure 1;

Figure 4 is a sectional view taken substantially along the section line 4—4 of Figure 2; and Figure 5 is an enlarged detail view of the trip mechanism for reversing the direction of motion imparted by the transmission.

Figure 1:
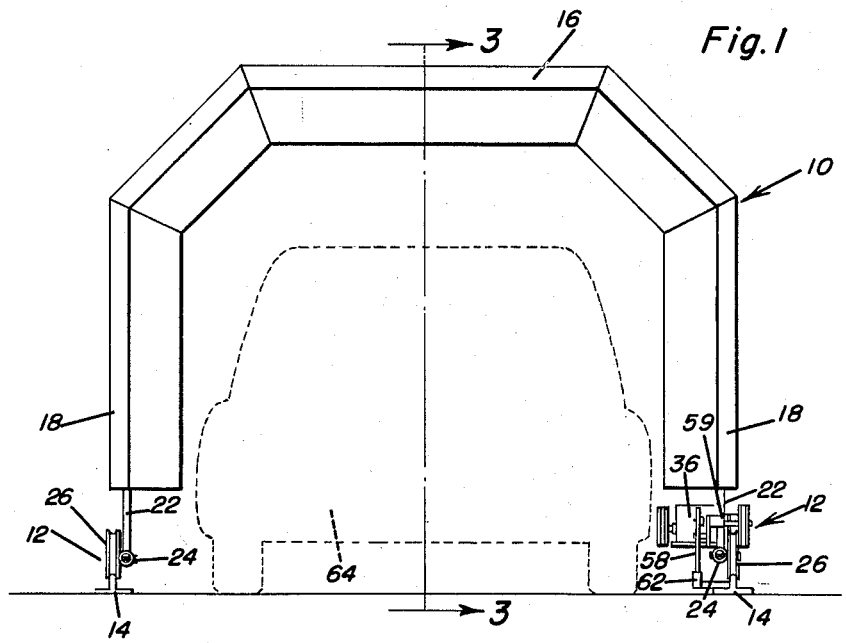
Figure 1 is an end elevational view of the paint baking apparatus.
Figure 2:
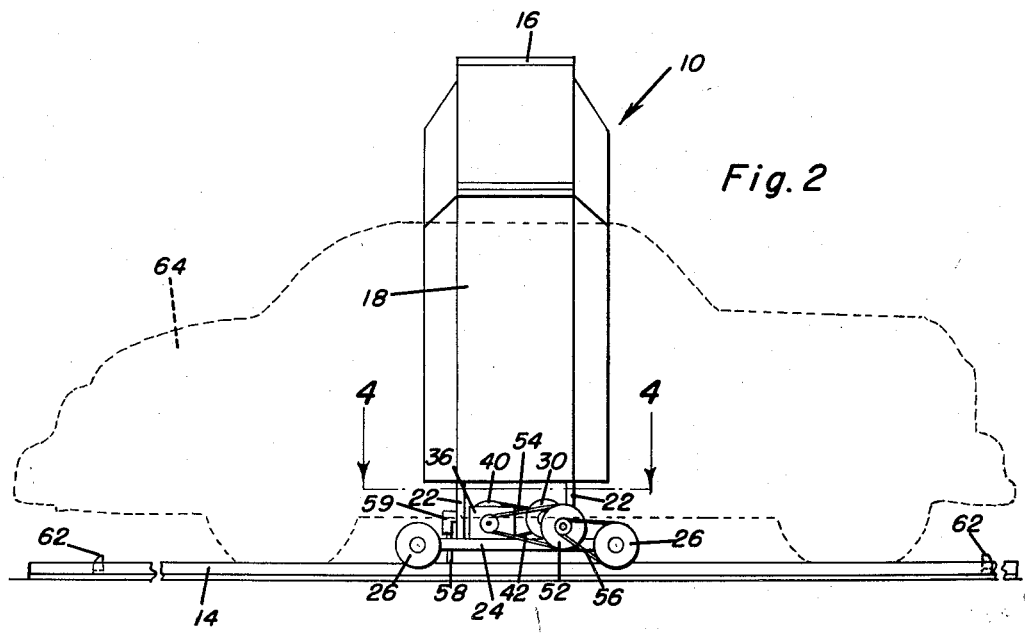
Figure 2 is a side elevational view of the paint baking apparatus.

Referring now more specifically to the accompanying drawings, it will be seen that the improved paint baking apparatus forming the subject of this invention includes, as shown in Figure 1, a substantially U-shaped carriage 10 having a wheel assembly 12 secured at the lower end thereof at each side, with the wheel assemblies 12 being adapted to ride upon a pair of spaced parallel rails 14.

The carriage 10 is formed of a U-shaped member having a bight portion 16 and a pair of depending legs 18. The bight portion and the leg portions are each formed of an inwardly facing channel. A plurality of heat lamps 20 are secured to the bight portion 16 and the leg portions 18 within the channels thereof.

Each of the leg portions 18 is provided with a pair of vertically disposed members 22 secured thereto and extending downwardly therefrom. A horizontal member 24 is secured to the lower end of each of the members 22. The members 24 are spaced inwardly from the parallel rails 14. A wheel 26 is secured to each end of the member 24 and is adapted to ride on the rails 14.

One of the members 24 has a platform 28 secured thereto. A motor 30 is mounted on the platform 28. The motor 30 has a shaft 32 extending from one side thereof. A pulley 34 is secured to the end of the shaft 32. A two-way transmission 36 is mounted on the platform 28 and has an input shaft 38 extending from one side thereof and parallel to the shaft 32. A pulley 40 is secured to the end of the shaft 38 and is axially aligned with the pulley 34 on the shaft 32. A belt 42 is entrained around the pulleys 34 and 40 whereby the motor 30 will drive the pulley 40.

An output shaft 44 extends from the other side of the transmission 36 and a pulley 46 is secured to the end of the shaft 44. A shaft 48 is secured to one of the members 22 and extends horizontally therefrom. A pair of pulleys 50 and 52 are mounted on the shaft 48. The pulleys 50 and 52 are fixedly secured together, and the pulley 52 is axially aligned with the pulley 46 on the shaft 44. The pulley 50 is of a lesser diameter than the pulley 52. A belt 54 is entrained around the pulleys 52 and 46. The pulley 50 is axially aligned with one of the wheels 26 and a belt 56 is entrained around the pulley 50 and the wheel 26. Thus, when the motor 30 is in operation, the wheel 26 will be driven by means of the belt and pulleys.

The transmission 36 is of a variable speed hydraulic transmission and is capable of transmitting forward and reverse motion. Control means are provided for reversing the direction of movement imparted by the transmission. The control means comprises a first link 58 pivotally secured adjacent the midpoint thereof to a bracket 59 secured to one of the members 22. The link 58 is vertically disposed and has secured to the upper end thereof a link 60 which extends through the wall of the transmission 36 to the interior thereof for shifting the gears therein. The lower end of the link 58 engages upwardly extending projections 62 on the rail 14 for reversing the movement imparted by the transmission.

In practical use, an automobile 64 or the like is driven into position between the spaced rails 14. The automobile is then given a coat of paint. Then, the heat lamps 20 are turned on. The motor 30 is then started and the transmission 36 is adjusted to the desired speed. The carriage 10 will then move on the rails 14 over the automobile 64. When the carriage 10 reaches one end of the rails 14, the projection 62 will engage the link 58 thereby reversing the transmission. The carriage 10 will then travel in the reverse direction until the link 58 strikes the projection 62 at the other end of the rails 14. The carriage 10 will travel back and forth over the automobile 64 until the paint has been dried the desired amount.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A paint baking apparatus comprising a U-shaped vertical member having side legs, heat lamps mounted in said member, a pair of parallel spaced side rails, means mounting said member on said rails for movement in opposite directions comprising a pair of vertical members depending from each leg, a horizontal member connecting each pair of vertical members, a pair of rail engaging wheels on the ends of each horizontal member, a platform mounted on one pair of the vertical members between the wheels of one of the pairs and extending outwardly from said pair of said vertical members, a reversible transmission on said platform operatively connected to one wheel of said pair, a motor on said platform operatively connected to said transmission, a vertical link pivoted between its ends on one vertical member of said pair and swingable in opposite directions, a horizontal link pivoted to the upper end of the vertical link and extending into the transmission to reverse the same upon movement of the vertical link in opposite directions, and a pair of upright projections on one rail adjacent opposite ends thereof for engaging the lower end of the vertical link to swing the same in opposite directions in response to movement of the U-shaped member in opposite directions.

References Cited in the file of this patent

UNITED STATES PATENTS

| | | |
|---|---|---|
| 1,831,152 | Weisker | Nov. 10, 1931 |
| 2,405,631 | Attwood | Aug. 13, 1946 |
| 2,521,232 | Lashells | Sept. 5, 1950 |
| 2,688,068 | Marr | Aug. 31, 1954 |
| 2,708,707 | Merrill | May 17, 1955 |

OTHER REFERENCES

Industrial Applications of Infra Red, by J. D. Hall, McGraw-Hill Book Company, Inc., 1947, p. 159.